United States Patent

[11] 3,588,465

| [72] | Inventors | Emmett R. Anderson<br>Berkeley;<br>Robert E. Rutz, Drinda, Calif. |
|---|---|---|
| [21] | Appl. No. | 771,512 |
| [22] | Filed | Oct. 29, 1968 |
| [45] | Patented | June 28, 1971 |
| [73] | Assignee | Air Reduction Company, Incorporated<br>New York, N.Y. |

[54] LINE VOLTAGE COMPENSATING PULSED POWER WELDING SUPPLY
3 Claims, 8 Drawing Figs.

[52] U.S. Cl............................................. 219/137,
219/131
[51] Int. Cl............................................. B23k 9/00
[50] Field of Search........................................ 219/131,
137; 323/22 (SCR)

[56] References Cited
UNITED STATES PATENTS

| 3,249,735 | 5/1966 | Needham | 219/131 |
| 3,359,403 | 12/1967 | Pettit, Jr. et al. | 219/131F |
| 3,408,558 | 10/1968 | Peterson et al. | 323/22SCR |
| 3,424,970 | 1/1969 | Ross | 323/22SCR |
| 3,432,739 | 3/1969 | Kauffman | 323/22SCRX |

Primary Examiner—J. V. Truhe
Assistant Examiner—George A. Montanye
Attorneys—Larry R. Cassett, H. Hume Mathews and Edmund W. Bopp ABSTRACT: The pulsed power welding process is improved by using shorter arc lengths, which bring a need for holding the arc voltage substantially constant. To do this, line voltage compensation is required. It is accomplished in a pulsed power welding supply by a feedback loop which controls the portion of the cycle during which current is passed through a trigger rectifier, which trigger rectifier is not coupled to the load circuit. The trigger rectifier controls the passage of power through a heavy duty, power-type rectifier which is energized during periods of welding. The feedback loop is allowed to reach a steady state before power is first applied to the power rectifier, with the result that transients in the power rectifier load are avoided. In the loop, a comparison is made between a manually controllable reference wave and a sample wave derived from the output of the trigger rectifier. Line voltage variations are compensated by changes in the length of the portion of the cycle during which the trigger rectifier is conducting.

INVENTORS
EMMETT R. ANDERSON
ROBERT E. RUTZ
BY Larry R. Cassett
ATTORNEY

LINE VOLTAGE COMPENSATING PULSED POWER WELDING SUPPLY

BACKGROUND OF THE INVENTION

The pulsed power welding process disclosed and claimed in U.S. Pat. No. 3,071,680, issued Jan. 1, 1963 to N. E. Anderson and W. J. Greene and owned by the assignee herein, is characterized by spray-type transfer of metal from the electrode to the workpiece, accomplished with a relatively low average arc current. Accordingly, the metal is deposited at a relatively low temperature, resulting in reduced fluidity of the metal deposit. This represents a significant advantage in applications such as vertical welding where high fluidity can cause the metal to run out of the joint before it can solidify.

To control the temperature of the base metal so that an adequate fusion with the deposited metal is obtained, a relatively short arc length is required. As the arc length is proportional to the arc voltage, the arc voltage must be relatively low, typically in the neighborhood of 20 volts. At this low voltage, line voltage fluctuations are critical. A lowering of the line voltage is likely to cause the arc to go out, and a rise in line voltage will cause the electrode to burn back more rapidly, even burning the electrode back to the contact tip which impresses welding current upon the electrode.

A further reason for using a relatively short arc is that the heat pattern in the arc is such as to distribute the heat unevenly over the area of the workpiece exposed to the arc, which can cause excessive melting in parts of the exposed area.

This effect is known as undercutting, and produces irregularities in the welded joint. The effect becomes less significant as the arc is shortened, since the area exposed to the arc is reduced and the heat is more evenly distributed over the exposed area.

Semiconductor devices, notably silicon controlled rectifiers (SCR's) are commonly used in welding power supplies not only as rectifiers but at the same time for power regulation by connecting the gate electrodes of the SCR's to a triggering circuit which can control the amount of power passed through the SCR's. The power passed can be increased or decreased by controlling the amount of time the SCR is in the conducting state during each cycle of the supply voltage impressed thereon.

Feedback loops including the load circuit have been used to hold the arc voltage constant regardless of line voltage fluctuations. However, these measures have greatly increased the cost of the equipment, and have been found objectionable in that they tend to alter the starting characteristics of the equipment.

Furthermore, transients in the load at startup tend to be troublesome in prior art regulating systems using SCR's. When a regulator reference voltage is present at startup, and the load is then connected to the power supply, the feedback sample wave builds up over a certain period of time. At the start, there is no feedback voltage. Consequently, the system will turn the power supply full on, giving too high a starting voltage. In a welding system, this condition will cause blasting and loss of shield gas protection when the welding arc is struck. Only after the feedback has built up to the proper steady value will the output voltage be cut back to the preset level. On the other hand, if the regulator reference source is turned on at the same time as the main power, the regulator calls for a gradual drawn out buildup of the output voltage, over a period of time required to reach a steady state. In either case, the startup transient tends to cause porosity in the weld, and consequent weakness.

SUMMARY OF THE INVENTION

The invention provides an improved line voltage compensating system whereby the advantages of a pulsed power welding process may be realized with short arc lengths, particularly in vertical welding, without materially increasing the cost of the equipment.

In order to compensate for line voltage variations without at the same time interfering with the desired current-voltage characteristics of the power supply, the power rectifiers employed are fired by trigger rectifiers, which are included in the feedback loop but are not in the load circuit.

The isolation of the trigger rectifiers from the load enables the establishment of a substantially steady state in the trigger rectifiers before power is applied to the power rectifiers. As a result, there are no starting transients in the trigger rectifier circuits when the main power is applied to the system and no transients in the load attributable to the automatic voltage control feedback system.

The invention also protects against the failure of the power rectifiers to fire due to its being back-biased at the time a short triggering pulse is generated as is the case in certain circuit configuration wherein two or more power supplies are paralleled. This is accomplished by having the triggering rectifiers isolated from any other power supply.

The firing circuit for the trigger SCR's is energized before a welding operation is to be started. The system can be preset for any desired power output voltage level. When the main power is thereafter applied to the system, the power SCR's are energized and power output at the preset level of output voltage will appear instantly and without transients, at the arc electrode.

The voltage wave from the trigger SCR which is used to fire the power SCR is proportional to the no-load output voltage of the power SCR and has the same waveform. The voltage wave which fires the power SCR is also proportional to the line voltage but does not reflect any change in the power supply output voltage produced by loading of the power supply. The voltage wave which fires the power SCR is also used as feedback to the pulse phase shifting circuit. The result is that the average voltage fed back, and, therefore, also the average pulse power output voltage of the welder is constant regardless of line voltage changes. Accordingly, line voltage compensation is independent of the circuit configuration in the load circuit of the power supply.

In the system of the invention, a reference wave and a sample wave of unlike waveforms are compared in a circuit which is arranged to stabilize at an operating condition in which the direct current component of the sample wave is substantially equal to the direct current component of the reference wave.

The effect of voltage drift in certain of the transistor circuits employed in the firing circuit is nullified by use of a clamping diode connected with one terminal to ground.

Resetting of a bistable relaxation oscillator circuit between pulses from a pulsed oscillator current source is made certain and reliable by use of a capacitor charge maintained by a Zener diode, so that a back bias is placed on the oscillator circuit whenever the current therethrough falls close to zero.

BRIEF DESCRIPTION OF THE DRAWING

FIG. 4 is a diagram showing how FIGS. 2 and 3 are to be placed side by side to form a complete diagram.

DESCRIPTION OF THE PREFERRED EMBODIMENT

Figure 1:
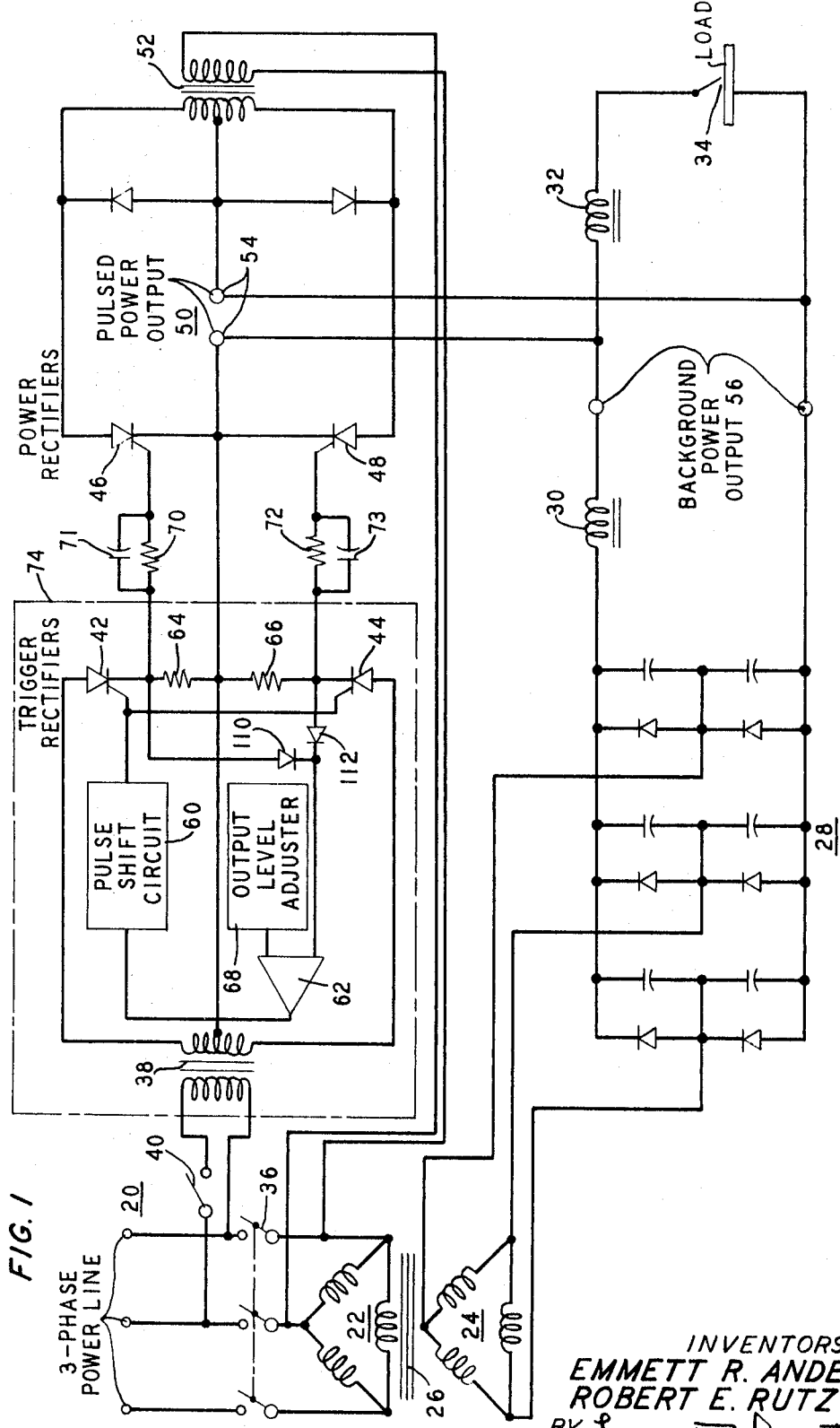
FIG. 1 is a general schematic diagram of an electric arc welding system embodying the invention.

Referring first to FIG. 1, an embodiment in a pulsed power electric arc welding system is shown in broad outline. Power is furnished by a three-phase line 20 by way of a primary winding 22 and a secondary winding 24 of a three-phase power transformer 26, to a three-phase full-wave rectifier bank 28 to supply background power through choke coils 30 and 32 to an electric arc 34 constituting the load for the system. A three-phase switch 36 is provided in the primary power lines. On the line side of the switch 36 a single-phase transformer 38 is connected through a switch 40 to supply power for firing a pair of rectifiers 42 and 44, which rectifiers function as the trigger rectifiers. The trigger rectifiers are arranged for triggering a pair of power rectifiers 46 and 48, which power rectifiers are part of a rectifier bridge 50. Power for energizing the bridge 50 is supplied by a single-phase transformer 52 in the same phase of the three-phase system as the transformer 38 but connected on the load side of the switch 36. The bridge 50 delivers pulsed power output at a terminal pair 54 and the rectifier bank 28 furnishes background power output at a terminal pair 56. This type of power supply and the welding process practiced therewith are described in previously mentioned U.S. Pat. No. 3,071,680.

It should be noted that the phase relationship between the transformers 38 and 52 is critical. If at a given instant the transformer 38 gives rise to current through the trigger rectifier 42 and so furnishes a firing pulse for the power rectifier 46, the phasing of the transformer 52 must be such that at the same instant the transformer 52 impresses a voltage across the power rectifier 46 in the conductive direction for that rectifier, otherwise the power rectifier 46 will not fire. If the phasing is wrong in any given instance it is only necessary to reverse the leads to one of the transformers 38, 52 to obtain the correct phasing.

A pulse shift circuit 60 controls the timing of gate pulses for firing the trigger rectifiers 42, 44. Automatic voltage control of the pulses passing through the trigger rectifiers employs a comparison circuit 62 which transmits a feedback to the pulse shift circuit 60. The circuit 62 compares a reference wave with a sample wave, the latter wave being formed from pulses in a pair of sampling resistors 64 and 66. The reference wave can be adjusted in amplitude manually by the operator by means of an output level adjuster 68 which can be remotely placed. Pulses are transmitted from the trigger rectifiers 42, 44 by way of a coupling resistors 70, 72 to the gate electrodes of the power rectifiers 46, 48.

Resistors 70, 72 serve as current limiting resistors for the protection of the gates of rectifiers 46, 48, but their resistors are selected so as to permit the passage of enough current to turn on the power rectifiers. The gate circuit affords a range of conduction within the power cycle extending at least from 30° to 150°. The circuit keeps the power rectifier gated from the instant the trigger rectifier is fired until the end of the cycle, thus insuring firing of the power rectifier as soon as reverse bias is removed from the power rectifier in case the reverse bias (due to the output of the background supply 28) is in effect when the trigger rectifier first fires.

In the operation of the system shown in FIG. 1, the operator before starting a welding operation will first close switch 40, leaving switch 36 open. He may then select a desired output level by means of the adjuster 68. The pulse shift circuit 60 and the comparison circuit 62 rapidly establish in the feedback loop a steady state condition in which the trigger rectifiers 42 and 44 are alternately fired in the successive half cycles of single-phase power wave supplied by the transformer 38 and the ratio of on-time to off-time in the rectifiers adjusts to give the desired average voltage across the resistors 64 and 66.

The operator may now close the switch 36, leaving the switch 40 closed. By this means, the main power is applied through the three-phase power transformer 26 to the rectifier bank 28, producing background power at the terminals 56. The major portion of the energy consumed in the welding operation is supplied through the transformer 52 to the rectifier bridge 50 including the power rectifiers 46, 48, producing pulsed power output at the terminal pair 54. The background power and the pulsed power are supplied alternately through the choke coil 32 to the arc 34. At such times as the background power is of greater voltage than the pulsed power, the power rectifiers 46 and 48 are back biased by the background power so that only the background power output is transmitted to the load. Similarly, at such times as the pulsed power is of the greater voltage the rectifier bank 28 is back biased, and only the pulsed power is transmitted to the load.

For the convenience of the operator, the switch 36 may be relay operated under the control of a trigger-type switch on a hand-held welding gun, or under the control of a conveniently located start button on a welding machine. The switch 40 will ordinarily be placed upon an operating console.

Figure 2:
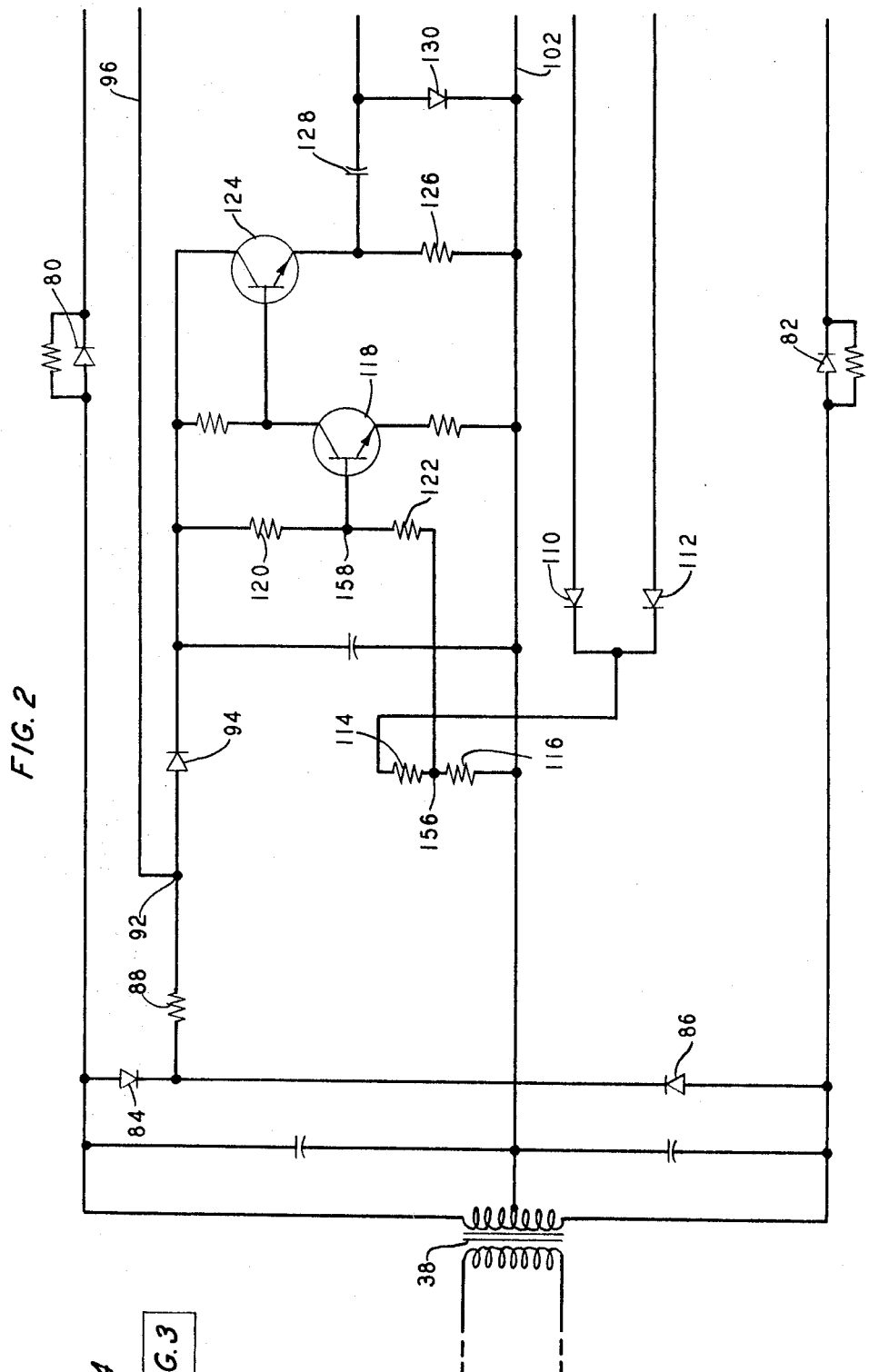
FIGS. 2 and 3, together show a more detailed schematic diagram of the firing circuit shown within a broken line box 74 in FIG. 1.
Figure 3:
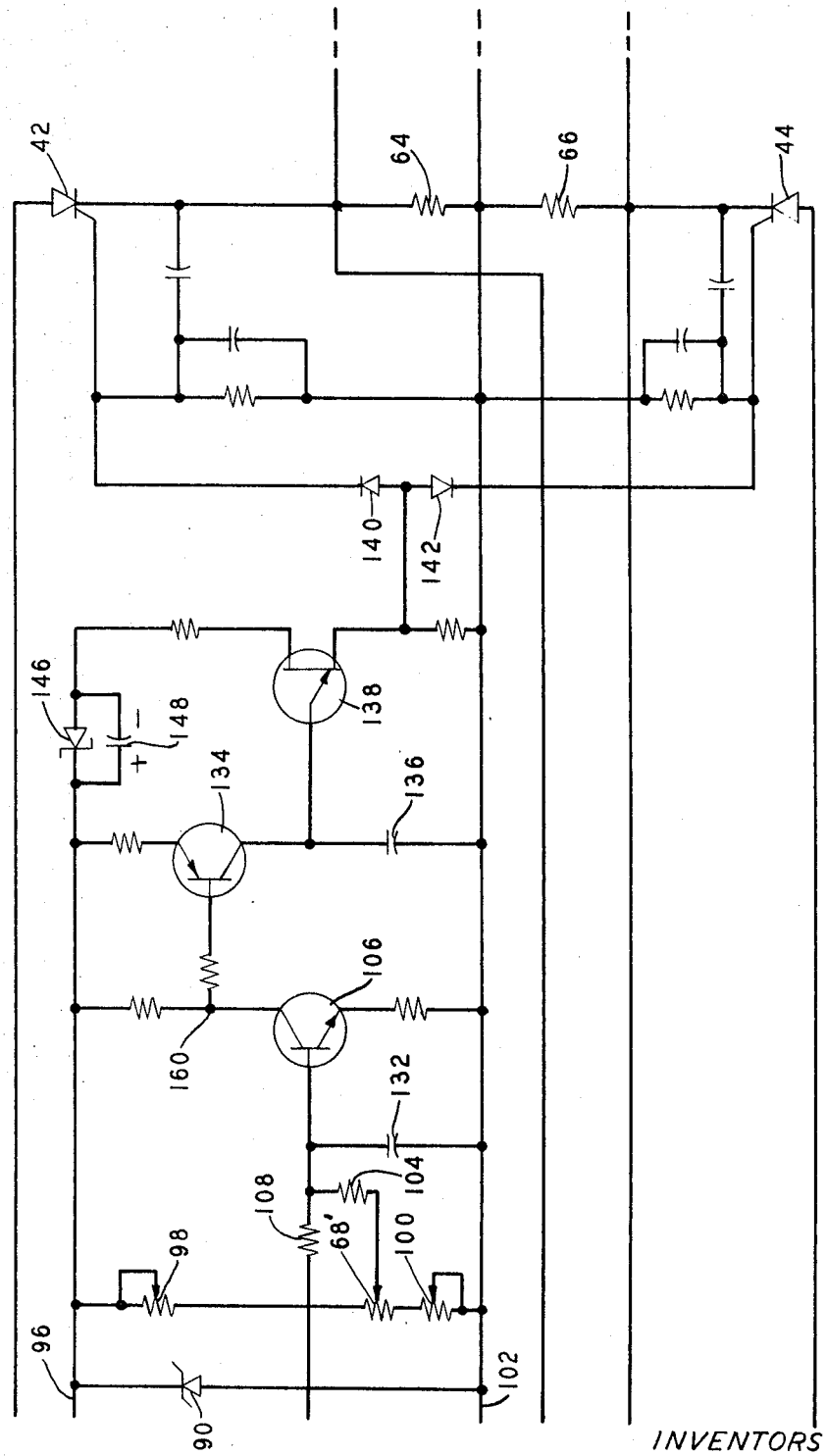

FIGS. 2 and 3, in combination, show an illustrative firing circuit suitable for use within the broken line box 74 in FIG. 1. The transformer 38 is repeated in FIG. 2, and the trigger rectifiers 42, 44, and the sampling resistors 64, 66, are repeated in FIG. 3.

Half-wave rectifiers comprising diodes 80 and 82 supply anode current from the secondary of the transformer 38 to the trigger rectifiers 42 and 44, respectively. A full-wave rectifier comprising diodes 84 and 86 supplies power for actuating various components of the firing circuit.

The output wave of the full-wave rectifier 84, 86 is truncated by means of a series resistor 88 and a shunt connected Zener diode 90, to render the average voltage of the resultant wave substantially insensitive to variations in powerline voltage. While powerline variations within a given industrial establishment in practice may run as high as plus or minus 10 percent in voltage, the peak voltage variation in the truncated wave remains constant. The truncated wave is impressed upon the junction 92 between the resistor 88 and a diode 94, and also upon a line 96 running to another portion of the firing circuit.

In practice, it has been found advantageous to employ a voltage limitation at the Zener diode 90 of about 20 volts to obtain the desired protection against line voltage variation as it affects the control circuits.

The reference signal for automatic voltage control is derived by leading current from the junction 92 through a rheostat 98, a potentiometer 68' which serves as the output level adjuster 68, and a rheostat 100, to reference point 102. The operator can select the desired output voltage by setting the movable arm of the potentiometer 68' on a calibrated scale. The movable arm of the potentiometer is connected through a coupling resistor 104 to the base of a transistor 106, which transistor serves as the comparison device 62.

The sample signal is derived from the sampling resistors 64, 66, passed through individual diodes 110 and 112, respectively, and combined in a potentiometer which comprises the serial combination of a pair of resistors 114 and 116, for application to the base of a transistor 118. The base potential of the transistor 118 is determined by a potentiometer comprising the resistor 116 is series with a pair of resistors 120 and 122. Variations in the voltage of the sample wave cause resultant variations in the same sense in the base of the transistor 118 connected to the junction 158 of the resistors 120 and 122. The signal from diodes 110, 112 undergoes certain signal conditioning operations, being inverted by transistor 118 prior to passing through an impedance matching transistor 124 on its way to comparison circuit 62.

The immediately preceding description sets forth how the sample wave, which is a terminal portion of a rectified sinusoidal wave starting at the instant of firing of the trigger rectifier and continuing to the end of the half cycle, is transmitted without material change in waveform other than an inversion to the output of the transistor 124. Here it is passed through a capacitor 128 having one side referenced through a diode 130. The diode insures a nullification of the effects of voltage drift in the transistors 118 and 124, by clamping the potential to ground at the side of the diode that is grounded by the diode 130.

The conditioned sample signal is impressed upon the base of the transistor 106 through a coupling resistor 108.

Figure 5:
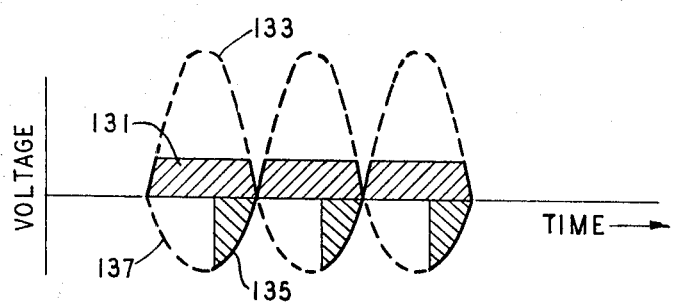
FIGS. 5—8 are diagrams useful in explaining certain features of the invention.

As will be noted, the reference wave and the sample wave compared in the transistor 106 are not of the same waveform. Furthermore, due to the inversion of the sample wave, the average voltage of the reference wave is of opposite to that of the sample wave. The different waveforms are illustrated graphically by idealized forms shown in FIG. 5, the reference wave being shown by upper hatched waveform 131, formed by truncating a rectified sinusoidal wave 133, and the sample wave being shown by the lower hatched waveform 135 formed from the terminal portion of a rectified sinusoidal wave 137. Despite the difference in waveform, the difference in the average voltages of the two waves is accurately obtained by integration of charges overtime on a capacitor 132 connected to the base electrode of transistor 106, between the junction of the resistors 104 and 108, and ground 102.

The time constant of the combination of the capacitor 132 and the resistors through which this capacitor charges and discharges is the primary factor in determining the response time of the feedback loop. By selection of suitable capacitance the response may be made sufficiently slow to permit stable operation under all expected load conditions. A suitable response time may lie in a range from about five cycles of a 60-cycle power wave up to as much as a few seconds.

The output signal from the transistor 106 is used to vary the output resistance of transistor 134, the resistance of which, in series with capacitor 136 provides an adjustable RC time constant for firing a unijunction transistor 138. The time required for the capacitor 136 to charge through the transistor 134 to the firing potential of the emitter electrode of the transistor 138 provides a controllable delay period for the firing of the transistor 138. When the transistor 138 fires, it transmits a signal through a pair of diodes 140 and 142 to the respective gate electrodes of the trigger rectifiers 42 and 44. It will be noted that only that one of the rectifiers 42 and 44 which is receiving a positive anode voltage at the time of receiving a gate pulse will be fired, and that the rectifiers 42 and 44 will be fired alternately.

Figure 6:
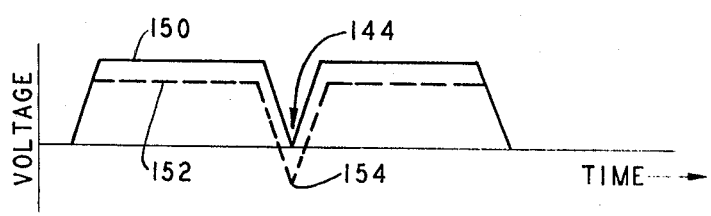

The unijunction transistor 138 operates in a bistable relaxation oscillator circuit in the manner of a thyratron, in that once it fires, current continues to flow through the two base electrodes and cannot be shut off by applying any voltage to the emitter, as long as a source of current in the proper direction is connected to the base circuit. The base current can only be stopped by breaking the base current circuit or by applying a back bias to the base circuit. The use of the truncated wave from line 96 as shown by wave 150 in FIG. 6 affords only relatively brief periods in which the voltage of the wave dips to zero potential as shown at 144 in FIG. 6. The superposition of transient voltages can easily cause the voltage on the base circuit of the transistor 138 to fail to reach zero, so that the transistor tends to remain in the firing condition. It is desired that the transistor 138 be reset after each firing. To insure this result, a Zener diode 146, paralleled by a capacitor 148 is inserted in the base circuit of the transistor 138. When current flows through the base circuit, the Zener diode 146 develops a fixed voltage drop across its terminals and maintains a charge in the capacitor 148. The polarity of the charge is positive toward the line 96 and negative toward the base circuit of the transistor 138. FIG. 6 shows by wave 152 the reduced voltage effective upon the base circuit of the transistor 138 due to the voltage drop in the Zener diode 146. When the wave 150 drops to or near zero, the wave 152 drops with the wave 150, carrying the base potential below zero at 154, insuring back biasing of the transistor and consequent resetting of the transistor.

In practice, where the voltage applied to the Zener diode 146 by the Zener diode 90 over the line 96 is about 20 volts, it has been found advantageous to use a voltage limitation in the Zener diode 146 of about 6.2 volts in order to assure positive resetting of the transistor 138.

The automatic voltage control action in the feedback loop shown in FIGS. 2 and 3, will now be traced. First, let it be supposed that the average voltage of the wave put out by the trigger rectifiers 42, 44, is greater than that called for by the setting of the output level adjuster 68. The average voltages developed across the resistors 64, 66, will then be greater than they should be. This increases the current through the diodes 110, 112, raising the potential at the junction 156 between the resistors 114 and 116. Likewise, there is an increase in potential at the junction 158 at the base of the transistor 118. The current through the transistor 118 increases, causing a drop in the potential of the base of the transistor 124, and a gradual drop in the voltage on the integrating capacitor 132. This in turn causes a drop in the current through the transistor 106, and raises the potential at the point 160 in the base circuit of the transistor 134. This voltage rise opposes current flow from the emitter to the base of the transistor 134, raising the internal resistance of the emitter-collector path of that transistor, thereby causing the firing of transistor 138 later in the cycle. The result is later firing of the trigger rectifiers 42 and 44, thereby reducing the average voltage of the sample wave and giving the desired direction of voltage regulation. A corresponding voltage regulation is found when the voltage of the sample wave is less than the desired value.

Figure 7:
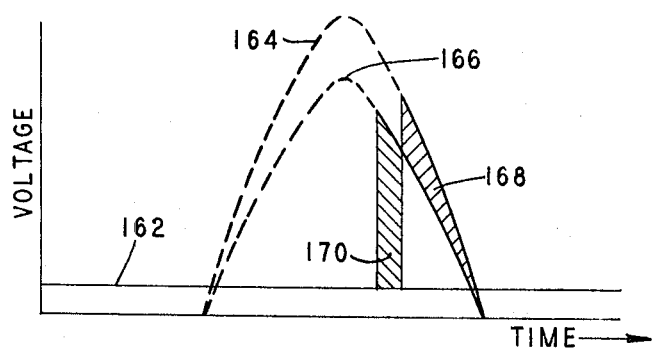

The manner in which the system of the invention compensates for line voltage variations will be evident from FIG. 7, in which horizontal line 162 represents the level of the background voltage and the broken curve 164 represents a power pulse superimposed upon the background. Supposing that the line voltage drops, the pulse height will decrease, as shown by broken curve 166. Since the background is relatively weak compared to the height of the power pulse, the line voltage will have no significant effect upon the background level. The lowering of the line voltage causes a loss of volt-seconds as indicated by the hatched area 168. To make up for this loss, the firing circuit advances the firing angle, thereby increasing the volt-seconds of the pulse by the amount shown by the hatched area 170, the system thus automatically compensating for the loss and maintaining the average output voltage substantially constant under line voltage variations.

Figure 8:
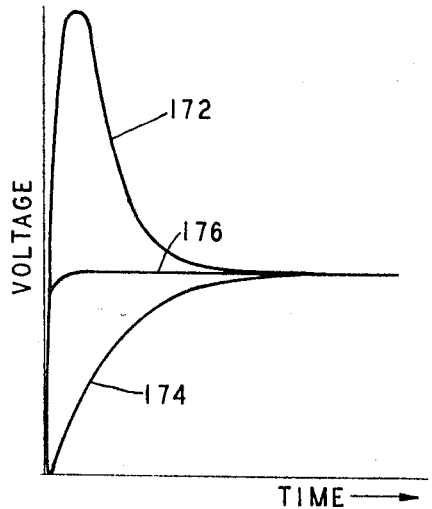

The overshooting type of startup transient which results in systems of the prior art when the reference voltage is present at startup and the feedback voltage starts from zero and builds up to a steady value when the main power is turned on, is shown in FIG. 8 by the curve 172. The other type of startup transient found in prior art systems wherein the reference voltage and the feedback voltage both build up from zero when the system as a whole is energized, is shown in FIG. 8 by curve 174. The preferable startup curve, shown at 176, and which is closely approximated when the present invention is utilized, rises immediately to the desired output voltage level without any significant transient. The transients, if not avoided, can cause porosity and consequent weakness in the weld.

Transients in the load circuit at startup are substantially avoided in a system embodying the invention, because when the operator closes the switch 40 before closing the switch 36 at startup, the firing circuit quickly stabilizes to a substantially steady state. When the switch 36 is thereafter closed, the firing of the power rectifiers is accomplished immediately at the proper timing as set by the output level adjuster and power is applied to the arc at the desired voltage, and there no transients are created by the action of the automatic voltage control feature.

Since in practice both the background voltage and the pulse height may be varied by operator, he may unintentionally put the system into a condition in which a need for protection against failure to fire will arise, as follows. If the operator turns up the output level adjuster 68 to call for higher and higher output levels, the system calls for firing the power rectifiers earlier and earlier in the cycle, until the call may come so early that the line power voltage has not yet risen above the level at which the power rectifiers are back biased by the background rectifiers in the bank 28. In this case, a firing pulse impressed upon the gate electrode of the power rectifier will not fire the rectifier, resulting in a loss of power. Such a failure to fire is avoided in the system of the present invention, because the trigger rectifiers are never back biased by the background rectifiers, there being no coupling between the two sets of rectifiers. Accordingly, the trigger rectifier fires at the proper time and places a firing voltage upon the gate electrode of the power rectifier, which firing voltage remains upon the gate electrode until the end of the cycle. Consequently, when the power rectifier is released from the back bias, the firing voltage is still there and causes the power rectifier to fire. While this firing may be delayed beyond what the control calls for, there is no failure to fire.

Tests on a power supply employing the invention show that a line voltage variation of 10 percent result in not more than a 1¼ percent variation in the output voltage. These also indicated that the output of the supply could easily be made even less sensitive to line voltage variations.

It will be evident that the invention is applicable to single-phase systems, and multiphase systems of any number of phases, and to any pulsing frequency, including, for example, one, two or more pulses per cycle in any given phase.

Switching may be provided for selecting either half-wave or full-wave rectifying circuits in order to provide one or two pulses per line cycle.

While illustrative forms of apparatus and methods in accordance with the invention have been described and shown herein, it will be understood that numerous changes may be made without departing from the general principles and scope of the invention.

We claim:

1. A pulsed power arc welding supply comprising input terminals adapted for connection to an AC source, power transformer means connected to said terminals, first controlled-rectifier switching means connected to said power transformer, second transformer means connected to said terminals, second controlled-rectifier switching means connected to said second transformer, a dummy load connected to the output of said second controlled-rectifier switching means to receive voltage passed by said switch means, reference voltage means, comparison means connected to the reference means and the dummy load means to compare the average signals thereacross and to develop an output responsive to the relationship between such input signals, said comparison means output signal connected to said second controlled-rectifier switching means to vary the width of the pulse passed therethrough to maintain a preselected relationship between said reference and dummy load signals, and said first controlled-rectifier switching means connected to said dummy load circuit to be actuated thereby when the power transformer is energized.

2. The apparatus according to claim 1 comprising in addition thereto, switching means connected in circuit completing relationship with said input terminals and said second transformer means and said second controlled-rectifier means whereby the circuit between said terminals second transformer means and second controlled-rectifier can be completed independently of said first transformer means.

3. The method of energizing an electric arc welding power supply from which power is supplied to a welding arc circuit in a series of current pulses and the amount of power is automatically controlled by regulating the width of said pulses by means of a feedback signal comprising energizing a pulse width control circuit from which the feedback signal is derived and which is separate from the welding arc circuit and after permitting such control circuit to stabilize to produce a desired pulse width then energizing the welding arc circuit while simultaneously slaving the welding arc circuit to the control circuit.